Patented Oct. 8, 1946

2,409,084

UNITED STATES PATENT OFFICE 2,409,084

PROCESS OF BLEACHING AND STERILIZING STARCH

George Paul Vincent, Poughkeepsie, N. Y., assignor to The Mathieson Alkali Works, Inc., New York, N. Y., a corporation of West Virginia No Drawing. Application August 3, 1940,
Serial No. 351,207

5 Claims. (Cl. 127—71)

This invention relates to the treatment of starchy substances and starches such as for example corn, "tapioca," "sago" and "arrowroot" starch. By treating starch in accordance with the process of my invention desirable changes may be made in its properties, one or more of which are necessary processing steps in the preparation of starch for commercial utilization. Dependent upon the use to which it is put, starch may by my process be bleached, sterilized and rendered thermophile-free, or oxidized and solubilized. The process of the invention in accomplishing these ends comprises treatment of the starch with a minor proportion of a soluble chlorite, and preferably an "activated" chlorite, the specific reaction conditions for any given treatment being dependent in part on the type of starch treated and the particular result desired. The maximum proportion of chlorite in any treatment is not in excess of about 2.5% by weight calculated on the dry weight of the starch and in most instances an amount of chlorite substantially less than this value is sufficient.

In numerous commercial uses of starch, current trade requirements necessitate bleaching and the attainment of a high degree of white while at the same time precluding any substantial chemical reaction with the body of the starch, and where used in food stuffs precluding the retention of any chemical or medicinal odor. Various bleaching agents have in the past been proposed and employed to accomplish these results, but the tendency of most bleaching agents to attack the starch and to leave undesirable residues and aromas in the product has made the problem of attaining a satisfactory bleach a difficult one and in most instances has involved the use of rigorously controlled and expensive processes. The present process provides a method of bleaching starch to any desired degree without attacking the starch itself or introducing undesirable residues or aromas.

In accordance with one embodiment of my invention starch is easily and rapidly bleached by treatment with a minor proportion of a soluble chlorite, sodium or calcium chlorite for example, and an agent which I shall refer to herein as an "activation" agent. The agents, which I shall refer to herein and in the claims as "activation" agents, and which make possible the attainment of any desired degree of bleaching without injury to the starch in a rapid and easily controlled reaction, include acidic substances, soluble hypochlorites and chlorine gas. The substances which successfully "activate" the chlorite in the presence of starch are those which when added to a substantially neutral solution of a chlorite cause the production of $ClO_2$ gas. Hydrochloric and acetic acids for example are such substances as are also soluble hypochlorites and chlorine. The amount to be used in the present process will depend on the amount of chlorite present and the speed of reaction desired. An amount sufficient to accomplish the desired degree of "activation" but not enough to leave a substantial residue in the reaction mixture is preferred. I am not able to explain the mechanism by which such agents promote the oxidizing action of the chlorite, but it is a fact that when introduced into the mixture of starch and chlorite, a regular and rapid reaction follows.

The most desirable conditions of reaction for bleaching starch by the present process will depend on the particular starch used and the properties which it is desired to impart to the starch. I have found that for bleaching, an amount of chlorite less than and in most instances substantially less than 1.5% by weight on the dry starch will accomplish the desired degree of bleaching.

A satisfactory bleach may be obtained by conducting the reaction substantially in the dry state, i. e. the only water present being that present in the starch itself and the small amount contained in the crystalline reagents. I have found that, for example, if a small proportion of sodium chlorite within the range 0.25% to 1.25% by weight on the starch is thoroughly mixed with "sago" flour and a small proportion of crystalline oxalic acid is added, a high degree of bleach is attained after the mixture has been allowed to stand for a period of a few hours. In one particular instance "sago" flour was thoroughly mixed with 0.45% available chlorine in the form of sodium chlorite and 0.5% by weight crystalline oxalic acid added. Upon standing a satisfactory bleach was obtained and no residue of available chlorine was left in the mixture. An alternative procedure to the use of oxalic acid in such a reaction is to pass hydrochloric acid vapor through the dry mixture.

As previously stated one advantageous type of activating agent for my process comprises acidic agents, i. e. free acids or acid salts. Acids which may be conveniently used are acetic acid, oxalic acid and hydrochloric acid. With many types of starch, satisfactory bleaching results may be attained by the use of from 0.01 to 0.15% sodium chlorite on the weight of the starch at a temperature below about 150° F. In such a treatment the reaction is carried on below the gelatinization point of the starch, this point for corn starch for example being 158° F. and for "tapioca" 148° F.

In accordance with a particularly advantageous embodiment of my invention the "activation" agent for the chlorite may be a soluble hypochlorite, sodium or calcium hypochlorite for example. This "activating" agent may be employed under either acid or alkaline conditions. When employed under acid conditions, it serves to accelerate the action of the acid present on the chlorite and permits a substantially decreased reaction time and operation at a lower temperature.

In accordance with a further embodiment of my invention starch may be bleached by being subjected to the action of a soluble inorganic chlorite which is "activated" by the addition of chlorine. Such a method of "activating" may be carried out under either an acid or alkaline reaction condition.

For certain commercial applications of starch, particularly in the food industry, a sterilized thermophile-free product is required. Considerable difficulty has been experienced in the past in sterilizing starch without at the same time imparting to the product a medicinal or other undesirable chemical odor. Furthermore, there are certain types of bacteria which are quite resistant to heat and can only be killed by the employment of relatively high temperatures. A sufficiently high temperature for this purpose, however, is frequently above the gelatinization point of the starch. I have found that treatment of starch with chlorite in accordance with the present invention successfully renders it thermophile-free and kills heat-resistant bacteria even at a relay low temperature without leaving behind a medicinal or chlorine-like odor. Treatment of starch as described above for the purpose of accomplishing bleaching will at the same time sterilize the starch. If a high degree of bleach is not required, sterilization may frequently be accomplished by the employment of substantially reduced quantities of chlorite and activating agent.

One of the most important industrial uses for starch is in the field of adhesives. In addition to use in various adhesive preparations starch is widely used in the preparation of coatings in the paper industry and in the textile industry. For such purposes, however, an oxidized or solubilized starch is necessary. To accomplish the necessary conversion raw starch is frequently oxidized and perhaps chlorinated by means of hypochlorite. Such an operation is of necessity a long and carefully controlled one which uses low temperatures but which must also employ low concentrations in order that the starch may not be excessively attacked, all of which adds materially to the cost of the product. Another common method of converting starch is to employ an enzyme, diastase for example, or the same result may be accomplished by the use of a peroxide which does not introduce excess alkalinity, for example barium peroxide. In such methods, however, the reaction must frequently be heated to a point above the gelatinizing temperature which introduces considerable difficulty. A gelatinized product must be used shortly after preparation and cannot readily be sold. I have found that the treatment of starch with an "activated" chlorite in accordance with the present invention provides an unusually successful method for the conversion of starch to a solubilized form suitable for use in the paper and textile industries. One of the results of the solubilizing of starch is that the viscosity is materially lowered, the amount of lowering permissible depending on the proposed use of the product. By my process the viscosity may be lowered so that the product is within any desired range. The present process may be used to solubilize starch by employing chlorite in the presence of an acid, or chlorite in the presence of hypochlorite preferably in the presence of an acid. In general the amount of chlorite and acid necessary in the first method, and the chlorite and hypochlorite in the second are greater than in the case where only bleaching is desired. Furthermore, the reaction is generally carried out at somewhat higher temperatures. The amount of chlorite employed should be between about 0.15% or better 0.25% and 2.5% by weight on the starch.

Soluble inorganic chlorites when used in the above type of reaction to solubilize starch appear to have a specific action attacking only the hull of the starch granule which is composed primarily of amylase, and do not attack to an undesirable extent the body of the granule. In distincttion to other solubilizing agents which must be rigorously controlled to avoid granule degradation, my process provides a simple, economical, and non-destructive method of solubilizing starch.

I claim:

1. In the bleaching and sterilizing of starch, the improvement which comprises subjecting the starch in a substantially dry state to the action of an activated soluble, inorganic chlorite by intimately admixing the starch with the chlorite and activating the chlorite while in admixture with the starch by an acid in a non-liquid state.

2. In the bleaching and sterilizing of starch, the improvement which comprises subjecting the starch in a substantially dry state to the action of an activated soluble, inorganic chlorite by intimately admixing the starch with the chlorite and activating the chlorite while in admixture with the starch by passing in contact with the admixture an acid in a non-liquid state.

3. In the bleaching and sterilizing of starch, the improvement which comprises subjecting the starch in a substantially dry state to the action of an activated soluble, inorganic chlorite by intimately admixing the starch with the chlorite and activating the chlorite while in admixture with the starch by passing hydrochloric acid vapors in contact with the admixture.

4. In the bleaching and sterilizing of starch, the improvement which comprises subjecting the starch in a substantially dry state to the action of an activated soluble, inorganic chlorite by intimately admixing with the starch the chlorite and a solid acidic agent.

5. In the bleaching and sterilizing of starch, the improvement which comprises subjecting the starch in a substantially dry state to the action of an activated soluble, inorganic chlorite by intimately admixing with the starch the chlorite and oxalic acid.

GEORGE PAUL VINCENT.